United States Patent

Bernstein et al.

[15] 3,697,975

[45] Oct. 10, 1972

[54] REMOTELY CONTROLLED SWITCHING SYSTEM

[72] Inventors: Karl Bernstein, Woodland Hills; E. Richard Walter, Los Angeles, both of Calif.

[73] Assignee: Safety Signaling, Inc.

[22] Filed: Aug. 6, 1969

[21] Appl. No.: 856,234

[52] U.S. Cl. ....................340/310, 340/216, 340/288

[51] Int. Cl. ..............................................H04m 11/04

[58] Field of Search.........340/310, 216, 288, 55, 167

[56] References Cited

UNITED STATES PATENTS

| | | | |
|---|---|---|---|
| 2,983,903 | 5/1961 | Philipps | 340/171 X |
| 3,458,657 | 7/1969 | Lester et al. | 340/310 X |
| 3,467,835 | 9/1969 | De Cola | 340/310 X |
| 3,462,756 | 8/1969 | Mills | 340/288 |

*Primary Examiner*—John W. Caldwell
*Assistant Examiner*—William M. Wannisky
*Attorney*—Nilsson, Robbins, Wills & Berliner

[57] ABSTRACT

A remotely controlled switching system comprising a transmitter having a power source including the charge on a capacitor thereby to provide a limited duration output signal. As the charge on the capacitor decays, the frequency of the transmitter output signal increases a predetermined amount. The receiver associated with the transmitter includes a tuned circuit which may include a piezo-electric crystal. As the transmitter signal frequency increases due to the discharge of the power supply capacitor, the signal frequency passes through the series resonant frequency as well as the parallel resonant frequency of the crystal. Thus, the receiver need not be fine tuned to a particular frequency to receive the output of a particular oscillator. Moreover, the receiver contains a circuit which prevents stray or transient signals from prematurely triggering its output circuit. The receiver output circuit includes means responsive to limited duration signals which means retains its status until definitely changed.

12 Claims, 3 Drawing Figures

PATENTED OCT 10 1972 3,697,975

INVENTOR.
KARL BERNSTEIN
E. RICHARD WALTER
BY
Nilsson & Robbins
Attorneys

REMOTELY CONTROLLED SWITCHING SYSTEM

FIELD OF THE INVENTION

This invention relates in general to remotely controlled switching systems, and, more particularly, to a switching system which utilizes the power lines of a home or building to interconnect the transmitter and receivers of the system.

BACKGROUND OF THE INVENTION

Switching systems which use a 60-cycle power line for interconnecting a transmitter to control a plurality of receivers remote from the transmitter utilize high frequency signals from the transmitter which are superimposed on the power line signal. Normally, the transmitter and the receiver do not require a separate DC power supply since they utilize a conventional rectifier circuit to supply power to the transmitter and receiver. A high frequency signal is generated by the transmitter to which the receiver is responsive. Upon receipt of the high frequency signal by a receiver tuned to the frequency, normally a control circuit associated with the receiver is actuated. Such a control circuit could be utilized to perform a specific function such as operate a machine, sound an alarm, or other essential task.

In conventional switching systems which utilizes the 60-cycle power lines entirely as a source of power as well as to transmit the high frequency control signals, it has been found that interference exists in the form of stray and unwanted signals transmitted along the power lines. Transient signals of this type often include many frequency components including the frequency at which a receiver of the system is set to respond. These signals can often prematurely trigger the receiver. Moreover, it has been found that when a receiver is responsive to a single predetermined frequency, slight drifts of the transmitter frequency can result in failure of the transmitter to initiate the desired response in the receiver. In addition, fine tuning of the receiver is required so that the receiver is correctly tuned to the transmitter frequency.

Such prior art systems function by maintaining the transmitter in its on state continuously to accomplish the desired end result or task; therefore, large amounts of heat are generated, long duration radio frequency signals are generated which may cause undue interference with radio and television signals, and there must be one transmitter for each function to be controlled.

In order to overcome the attendant disadvantages of prior art 60-cycle power wiring to a receiver connected thereto, the present system is a pulse operated system, and relatively unaffected by stray or transient signals. Further, the receiver need not be fine tuned exactly to the frequency of the transmitter. The resultant switching provides an efficient and highly reliable remotely controlled circuit.

SUMMARY OF THE INVENTION

More particularly, the switching system of the invention comprises a transmitter utilizing a charge on a capacitor at its power source thereby to provide a short duration, variable frequency signal, i.e. a "pulsed burst of energy," herein, a pulse. The receiver associated with the transmitter includes a tuned circuit tuned so that the variable frequency of the transmitter passes through both the series resonant frequency as well as the parallel resonant frequency thereof. Thus, the receiver need not be fine tuned to a frequency to receive the output of a particular transmitter. A pulse responsive output circuit is operatively associated with the receiver to perform a predetermined function upon receipt of a pulse from the transmitter.

The advantages of this invention, both as to its construction and mode of operation will be readily appreciated as the same become better understood by reference to the following detailed description when considered in connection with the accompanying drawings in which like referenced numerals designate like parts throughout the figures.

DESCRIPTION OF THE PREFERRED EMBODIMENT

Figure 1:
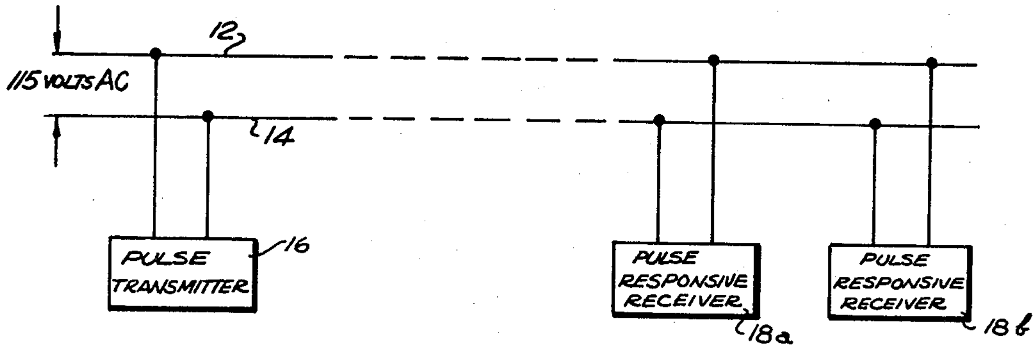
FIG. 1 depicts a schematic diagram showing the manner in which the transmitter and receiver of the present invention are connected into a household wiring system to accomplish the objects of the invention.

Referring now to FIG. 1, there is shown a schematic diagram of a preferred embodiment of the invention. As shown, the referenced numerals 12, 14 designate the conventional 60-cycle power lines normally available in a conventional building. Connected in parallel across the power lines are a pulse transmitter 16, and a pair of pulse responsive receivers **18*a*, 18*b*. The pulse transmitter 16 and pulse responsive receivers 18*a* and 18*b* may be plugged into the conventional outlet found in the home, however, the receivers may be adapted to replace the common wall switches presently used both physically and as to function. Signals from the pulse transmitter are coupled to the power lines 12, 14. Each of the pulse responsive receivers 18*a*, 18*b* may be tuned to different frequencies so that when the transmitter 16** transmits a signal at the tuned frequency of one of the receivers it can be utilized to actuate a device or to control a system, although more than one receiver may be tuned to be responsive to a single transmitter frequency. Moreover, a plurality of transmitters (or one transmitter with a plurality of oscillators tuned to different frequencies) could be utilized with the system, each coupled to the power lines and each associated with predetermined receivers.

Figure 2:
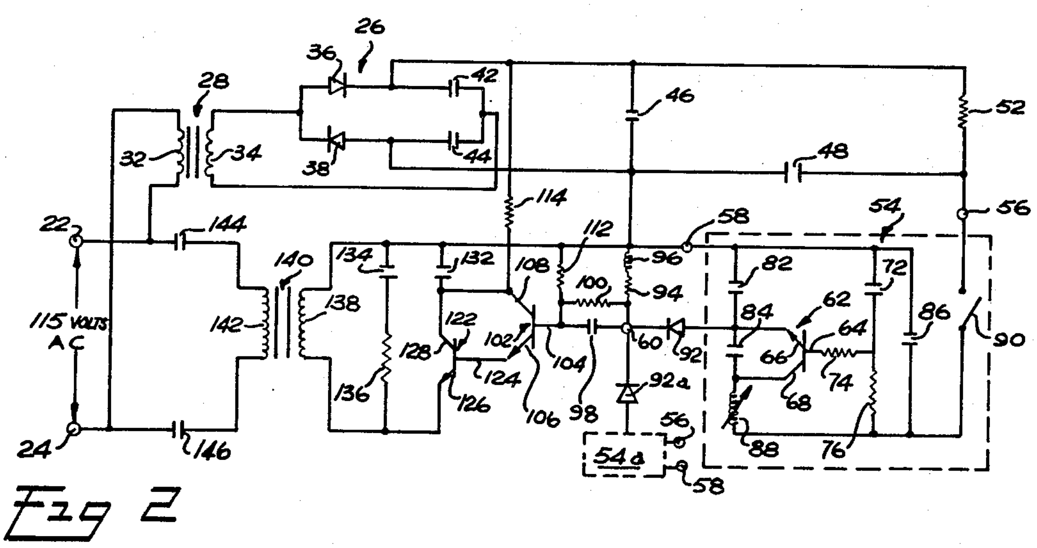
FIG. 2 shows a schematic diagram of a transmitter usable in the present invention.

Referring now to FIG. 2, there is depicted a preferred embodiment of the transmitter 16 in accordance with the invention. The transmitter is self-contained, that is, utilizes the 60-cycle power line as its source of power and no other external source of power is needed. The terminals 22, 24 of the transmitter are connected across the 60-cycle power lines.

The power supply for the transmitter is obtained from a voltage doubler 26. A transformer 28 has its primary winding 32 connected across the terminals 22, 24. One side of the secondary winding 34 of the transformer 28 is connected to the voltage doubler circuit at the junction of the anode of a first diode 36 and the cathode of a second diode 38. The other side of the secondary winding 34 is connected to the junction of a pair of capacitors 42, 44, the other side of the capacitors being connected to the cathode of the diode 36 and the anode of the diode 38, respectively. The output voltage of the voltage doubler circuit is obtained across an output capacitor 46, a first side of the capacitor 46 being connected to the junction of the cathode of diode 36 and capacitor 42 and the other side of the capacitor 46 being connected to the junction of the anode of diode 38 and the capacitor 44.

A capacitor 48 is also connected at one end to the other side of the capacitor 46 and the other end of the capacitor 48 is connected through a current limiting resistor 52 to the first side of the capacitor 46. The capacitor 48 is utilized as a power supply for an oscillator circuit 54. The junction of the capacitor 48 and resistor 52 is connected to a terminal 56 of the oscillator circuit. Further, the oscillator circuit contains a pair of terminals 58, 60.

The oscillator circuit also comprises a transistor 62 having a base 64, an emitter 66 and a collector 68. One side of capacitor 72 is connected to the terminal 58 and the other side connected to one side of a biasing resistor 74, the other side of which is connected to the base 64. A biasing resistor 76 connected at one side to the junction of the capacitor 72 and the resistor 74 the other side of which is connected to the junction of the capacitor 86 and the inductor 88. The frequency of oscillations of the oscillator circuit is controlled by the capacitors 82 and 84 and the inductor 88. The capacitor 82 is connected between the terminal 58 and the emitter 66. The capacitor 84 is connected across the collector-emitter circuit of the transistor 62. The inductor 88 is connected between the collector 68 and one side of the capacitor 86. The other side of the capacitor 86 is connected to the terminal 58. Further, a switch 90 connects the terminal 56 to the junction of the capacitor 86 and inductor 88. When the switch 90 is closed, the voltage across the capacitor 48 is applied across the oscillator circuit and the circuit commences to oscillate. At the time the switch 90 is closed the charge appearing on capacitor 48 instantaneously appears across capacitor 86. Therefore, if switch 90 is only momentarily closed, sufficient power is transferred to the oscillator circuit to sustain oscillations for a time sufficient to accomplish the desired end result. The inductor 88 is made tunable for fine tuning of the oscillation frequency. For major changes in the frequency of oscillation, the capacitors 82 and 84 must be changed and plug-in modules can be provided for major frequency changes. As shown by block **54*a* a plurality of oscillator circuits may be incorporated into a single transmitter housing each being individually connected to terminals 56, 58 and 60. Each oscillator would then be controlled by its own switch to apply the charge appearing across capacitor 48** thereto.

Output signals from the oscillator circuit are coupled to the anode of a diode 92, its cathode being connected to the terminal 60. The terminal 60 is coupled to the jucntion of the capacitors 46 and 48 through the series path comprising a biasing resistor 94 and a choke coil 96. Output oscillator signals forward bias the diode 92 and are thereby coupled through the parallel path formed by the capacitor 98 and resistor 100 to a transistor 102 at its base 104. The transistor 102 further comprises an emitter 106 and a collector 108. The base 104 of the transistor is connected through a biasing resistor 112 to the junction of capacitors 46 and 48. Further, the collector 108 is connected through a current limiting resistor 114 to the junction of the capacitor 46 and resistor 52.

The emitter 106 is connected to a transistor 122 at its base 124. The transistor 122, which is connected in a Darlington emitter follower configuration, further contains an emitter 126 and a collector 128 with the collector 108 connected to the collector 128. Further, the collector 128 is connected through an AC bypass capacitor 132 to the junction of capacitors 46 and 48. Also connected between the junction of the capacitors 46 and 48 and the emitter 126 is an output load impedance formed by an A.C. bypass capacitor 134 connected in series with a load resistor 136, the combination being connected in parallel with one winding 138 of an impedance matching transformer 140. The other winding 142 of the transformer is coupled at each end through a high pass filter formed by capacitors 144, 146 to the terminals 22, 24 respectively of the 60-cycle power line.

The charge on the capacitor 48 (or capacitor 86) which is the power source for the oscillator 54, starts to decay when the switch 90 is closed. Thus, as the charge on the capacitor decays, the oscillator output power decays and the frequency of the oscillator increases. Thus, should the transmitter be designed to operate in conjunction with a receiver which is tuned by means of a piezo-electric crystal, the oscillator frequency sweep caused by the power decay could be designed so that the sweep passes through both the series and parallel resonance points of the crystal in the receiver, eliminating the need for fine tuning of the receiver. Such frequency sweep also compensates for normal drift caused by temperature change affecting various components. Oscillator DC return to common (terminal 58) exists only during the time the diode 92 is forward biased. Such forward bias occurs only during the time the oscillator is functioning. Therefore, no load is placed on the power supply by any oscillator circuit unless the operate switch 90 has been depressed. Typically, the switch 90 is a momentary contact, normally open, type switch. Transistors 102 and 122 are also non-conducting until diode 92 is forward biased. Upon such forward biasing the proper bias relationships are set up on the electrodes of transistors 102 and 122 to effect the desired operation thereof.

Figure 3:
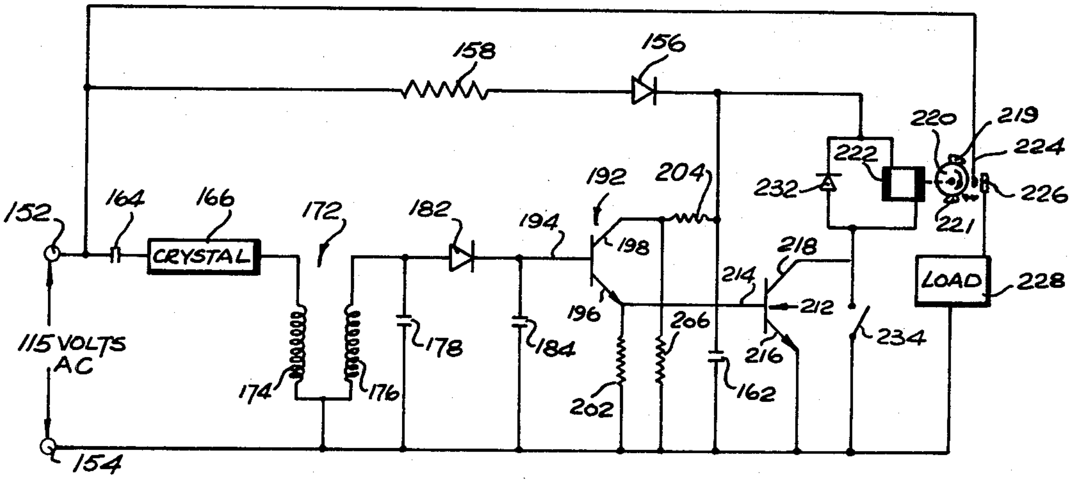
FIG. 3 illustrates a schematic diagram of a receiver usable in the present invention.

Referring now to FIG. 3, there is shown a diagram of a preferred embodiment of a receiver which can be used with the system. The receiver input terminals 152, 154 are connected to the 60-cycle source of AC voltage. In the receiver of FIG. 3, the terminal 154 is connected to the common or ground terminal of the voltage source. Typically, the terminals 152, 154 could be connected to two wires of a conventional three wire system where one of the wires is grounded and the other two wires have 230 volts between them. Thus, the voltage between the grounded wire and one of the other wires is 115 volts. The power supply for the receiver comprises a diode 156, whose anode is connected through a current limiting resistor 158 to the terminal 152. The cathode of the diode is connected to one side of a capacitor 162, the other side of which is connected to the common terminal 154.

Signals coupled from the power lines, which are of the type produced by the transmitter of FIG. 2, are coupled across the terminals 152, 154. A capacitor 164 acts as a high pass filter, blocking the 60-cycle line signal from the receiver circuit while passing the transmitted signal, and is coupled on one side to the terminal 152. The other side of the capacitor 164 is coupled to a piezo-electric crystal 166 which is excited by the signal voltage applied thereto. The other side of the crystal is connected to a transformer 172 at one side of its primary winding 174. The other side of the primary winding is connected to the common terminal. The first terminal of the secondary winding 176 is connected on one side of a capacitor 178, the capacitor 178 being connected across the secondary winding and to the common terminal. The crystal 166 and the capacitor 178 operate to tune the transformer 172 to the desired frequency of the receiver.

Signals at the desired frequency are coupled from the first terminal of the secondary winding to the anode of a diode 182. The diode 182 acts as a detector for signals at the desired frequency and the cathode of the diode is connected to one side of charging capacitor 184, the other side of which is connected to the common terminal. The voltage across the capacitor 184 is applied to a transistor 192, with the junction of the cathode of the diode 182 and the capacitor 184 being connected to the base 194 of the transistor 192. Further, the transistor 192 comprises an emitter 196, and a collector 198, the emitter 196 being connected through an emitter load resistor 202 to the common terminal 154.

Coupled across the capacitor 162 of the receiver power supply are a pair of series connected resistors 204 and 206 with the junction of the resistors being connected to the collector 198 to provide the power voltage therefor. The transistor 192 provides a high impedance to the voltage across the capacitor 184. The emitter 196 is connected to an output power transistor 212 at its base 214. The transistor 212 further comprises an emitter 216, which is connected to the common terminal 154, and a collector 218. The collector 218 is connected through a relay coil 222 to the junction of the diode 156 and the capacitor 162, the voltage across the capacitor 162 providing the proper supply for the collector 218. A diode 232 is connected across coil 222 with the anode of the diode being connected to the collector 218 and the cathode being connected to the junction of the diode 156 and capacitor 162 to short the inductive kick voltage. The relay coil has associated therewith an armature 220 and a pair of relay contacts 224, 226 with the contact 224 being connected to the terminal 152 and the contact 226 being connected through a load 228 to the reference terminal 154.

As is shown the armature 220 includes cams 219 and 221 extending therefrom. Upon energization of coil 222 the armature rotates approximately 90°. Upon such rotation one of the cams, for example cam 219, engages contact 224 and moves it into contact with contact 226 thereby completing the electrical circuit. The armature and contacts remain in such position until the coil 222 is once again energized to rotate the armature 90° and cause the contact 224 to move out of engagement with the contact 226. Thus, upon application of a pulse of power to the coil 222, the relay changes from one stable state to its other stable state and then remains in that stable state (it "remembers") until another pulse of power is applied. It should also be noted that the relay remains in its last stable state even though there may be a loss of line power.

The receiver normally operates with little or no bias applied to the transistors 192 and 212 such that transistors 192 and 212 are essentially non-conducting, that is, absent a received signal, the only bias applied to base 194 is from noise signals which are usually insufficient to cause conduction. When the receiver receives signals from a transmitter at a frequency to which the transformer 172 and crystal 166 and capacitor 178 are tuned, the capacitor 184 charges to a predetermined level at which time conduction of the transistor 192 and hence the transistor 212 is sufficient to actuate relay coil 222 and actuate armature 220 to close contacts 224 and 226, thus applying the voltage across the terminals 152, 154 across the load 228. Since the capacitor 184 must be charged to a predetermined level before the relay coil 222 can be energized, premature energization of the coil 222 is prevented, thus making the circuit insensitive to stray or transient signals which might be applied to the circuit from the other devices also connected to the 60-cycle power lines.

A switch 234 may be provided which is connected between the terminal 154 and the junction of the relay coil 222 and the anode of diode 232 bypassing the power transistor 212, to thus apply the power supply voltage directly to the coil 222 in order to provide manual operation of the apparatus or load 228. Thus, the load may be actuated remotely at the transmitter or locally at the receiver site.

Although the relay coil 222 may be designed as a pulse relay as described which is operable in such a manner that when current is applied to the coil the contacts 224, 226 are closed and remain closed until such a period of time as the next pulse is applied to the coil 222 at which time the relay contacts 224 and 226 are opened, other devices may be used to accomplish the same function. For example, the output of a flip-flop circuit could be utilized in numerous conventional ways to control the on and off times of other devices. Additionally, the output signal could be utilized to control an optical device such as a neon flip-flop circuit which, in turn, could control a silicon controlled switch or other similar device.

What is claimed is:

1. A switching system for generating and transmitting high frequency signals over a relatively low frequency power system comprising:
   - actuating switch means;
   - generating means responsive to actuation of said actuating switch means, said generating means including oscillator means for generating a single pulse of high frequency energy having a predetermined duration;
   - a capacitor;
   - means for charging said capacitor;
   - means connecting said capacitor to said generating means;

the charge on said capacitor providing the only power for said generating means, said duration being determined by the decay of voltage across a capacitor, the frequency of said energy changing during the duration thereof responsive to the decay of said voltage; and coupling means for coupling said pulse of energy from said generating means to said power system.

2. A switching system as defined in claim 1 in which said generating means includes at least one oscillator means and an amplifier means, and isolating switch means coupling said oscillator means to said amplifier means, said switch means being closed only in response to an output signal from said oscillator means.

3. A switching system as defined in claim 2 in which said isolating switch means is a diode connected to be forward biased by said oscillator means output signal.

4. A switching system as defined in claim 2 in which said amplifier means is non-conducting except during the time said isolating switch means is closed.

5. A switching system as defined in claim 3 including a plurality of oscillator means, each tuned to generate a pulse of energy having a different frequency and each including means for individual control thereof.

6. A switching system as defined in claim 1 further including receiver means responsive only to a portion of said pulse of energy and means coupling said receiver to said power system.

7. A switching system as defined in claim 6 which further includes bistable means responsive to said portion of said signal received by said receiver means to change from one of its stable states to the other.

8. A switching system as defined in claim 7 in which said bistable means is a pulse relay.

9. A switching means for generating and transmitting high frequency signals over a relatively low frequency power system comprising:

a direct current power supply;

means for generating a single pulse high frequency signal responsive to application of a source of power thereto, said generating means including oscillator means;

a capacitor coupled to said generating means;

momentary closure switch means coupled to said capacitor for coupling said power supply to said capacitor thereby to apply a charge thereto upon closure of said switch means, said charge on said capacitor forming the only power source for said generating means;

said generating means being coupled to said low frequency power system thereby applying said high frequency signal to said power system, the frequency of the signal increasing as the voltage across said capacitor decays;

a receiver coupled to said low frequency power system, said receiver having a tuned circuit at the input thereof tuned to the high frequency signals of said transmitter, said tuned circuit including frequency responsive means having a resonant frequency falling within those frequencies through which said generating means signal sweeps.

10. A switching system in accordance with claim 9 wherein said frequency responsive means comprises a piezo-electric crystal.

11. A signal system for use with a relatively low frequency power system comprising a transmitter for generating a varying frequency high frequency signal energy pulse over said low frequency power system, said transmitter including at least one oscillator means and an amplifier means, and isolating switch means coupling said oscillator means to said amplifier means, said switch means being closed only in response to an output signal from said oscillator means, and at least one pulse responsive receiver coupled to said power system, said receiver including tuned circuit means having a resonant frequency falling within the frequency range of said varying frequency of said high frequency generated signal, first means actuated by at least a portion of said varying high frequency signal energy pulse, and second means manually actuated whereby apparatus coupled to said receiver may be effected by actuation of either of said first and second means.

12. A signal system as defined in claim 11 wherein said receiver replaces a wall switch in an electrical wiring system.

* * * * *